United States Patent [19]

Kolb et al.

[11] 4,180,100

[45] Dec. 25, 1979

[54] CONTROL VALVE HAVING A LOW NOISE THROTTLING DEVICE

[75] Inventors: Fritz Kolb, Odenthal; Silvan Fehlisch; Otto Ziegert, both of Dormagen; Hans Bender, Mannheim; Manfred Schmitt, Boenheim-Roxheim, all of Fed. Rep. of Germany

[73] Assignee: Bayer Aktiengesellschaft, Leverkusen, Fed. Rep. of Germany

[21] Appl. No.: 799,614

[22] Filed: May 23, 1977

[30] Foreign Application Priority Data

May 22, 1976 [DE] Fed. Rep. of Germany ....... 2623078

[51] Int. Cl.² ............................................. F16K 47/08
[52] U.S. Cl. ............................ 137/625.3; 137/625.37; 251/127
[58] Field of Search ...................... 137/625.3, 625.37; 251/127, 118; 138/41, 42

[56] References Cited

U.S. PATENT DOCUMENTS

| 2,323,895 | 7/1943 | Buttner | 138/41 X |
| 3,042,078 | 7/1962 | Rosell | 137/625.3 |
| 3,731,903 | 5/1973 | Webb et al. | 251/127 X |
| 3,865,352 | 2/1975 | Nelson et al. | 138/42 X |

FOREIGN PATENT DOCUMENTS

| 216577 | 9/1956 | Canada | 138/42 |
| 2446780 | 4/1976 | Fed. Rep. of Germany | 251/118 |

*Primary Examiner*—Arnold Rosenthal
*Attorney, Agent, or Firm*—Sprung, Felfe, Horn, Lynch & Kramer

[57] ABSTRACT

The invention relates to a control valve for throttling in which is provided simple structural elements in the outlet section for having a low noise characteristic.

2 Claims, 2 Drawing Figures

CONTROL VALVE HAVING A LOW NOISE THROTTLING DEVICE

The invention relates to a control valve having a low noise throttling device.

Noise is produced when a flowing fluid is throttled. When the pressure of the fluid is released super-critically, this noise may become so loud as to be an intolerable nuisance.

In order to reduce the sound, control valves are provided with sound-reducing elements which are partially parallel-mounted or series-mounted, and which may comprise perforated discs, sintered rings, gratings or other resisting bodies. Furthermore, in some embodiments, the cross-sections of the flow may also be varied during operation.

A considerable disadvantage of many of these devices is their high risk of contamination. In some of these devices, the reduction in sound obtained is slight or the loss in pressure caused by the device is high.

The object of the invention is to provide a control valve having a controllable flow resistance, which provides for throttling with low noise generation and for the complete closure of the throttling device by means of simple structural elements.

According to the invention there is provided a control valve comprising a valve housing having a fluid inlet and a fluid outlet, a perforated cylindrical hollow body arranged centrally in the housing downstream of the inlet, a closure element which is displaceable by a regulating device and is situated in the hollow body, and a mass of small fluid-flow resisting bodies situated between the cylindrical hollow body and the valve outlet.

The advantage of this design according to the invention is that the flow of material through the small resisting bodies which are placed parallel one behind another is continually divided into new individual flows. The small eddy fields which are formed in this process only produce a low sound level, and the maximum of the frequency spectrum is displaced to higher frequencies. It has been found from experience that a sound of this type is deadened by the environment more quickly than a sound of lower frequency. There is also less local diffusion. Furthermore, the risk of natural resonance is also diminished by the random arrangement of the resisting bodies.

The control valve can easily be filled with the resisting bodies. It has been found experimentally that sections of pipe having perforated walls give particularly good results. The drop in pressure in this case is slight and the distribution of the flow is particularly intensive.

In one embodiment the resisting bodies are made of metallic wool. These bodies make it possible to distribute the flow finely and the risk of natural resonances is considerably reduced by the uneven structure. The insertion of resisting bodies of this type is also economical.

A flat perforated plate having openings which are smaller than the minimum dimensions of the resisting bodies may be arranged at the valve outlet. The perforated disc enables resisting bodies to be inserted in the control valve in a workshop so that it is simpler to install in the pipe system. In this way, the resisting bodies are also prevented from being located off-centre when the apparatus is in operation.

The resisting bodies may be in layers of different sized bodies. The throttling curve may be influenced over the range of the stroke of a piston constituting the regulating device by the differing sizes of the resisting bodies.

An embodiment of the invention is shown in the accompanying drawings, in which.

Figures 1, 2:
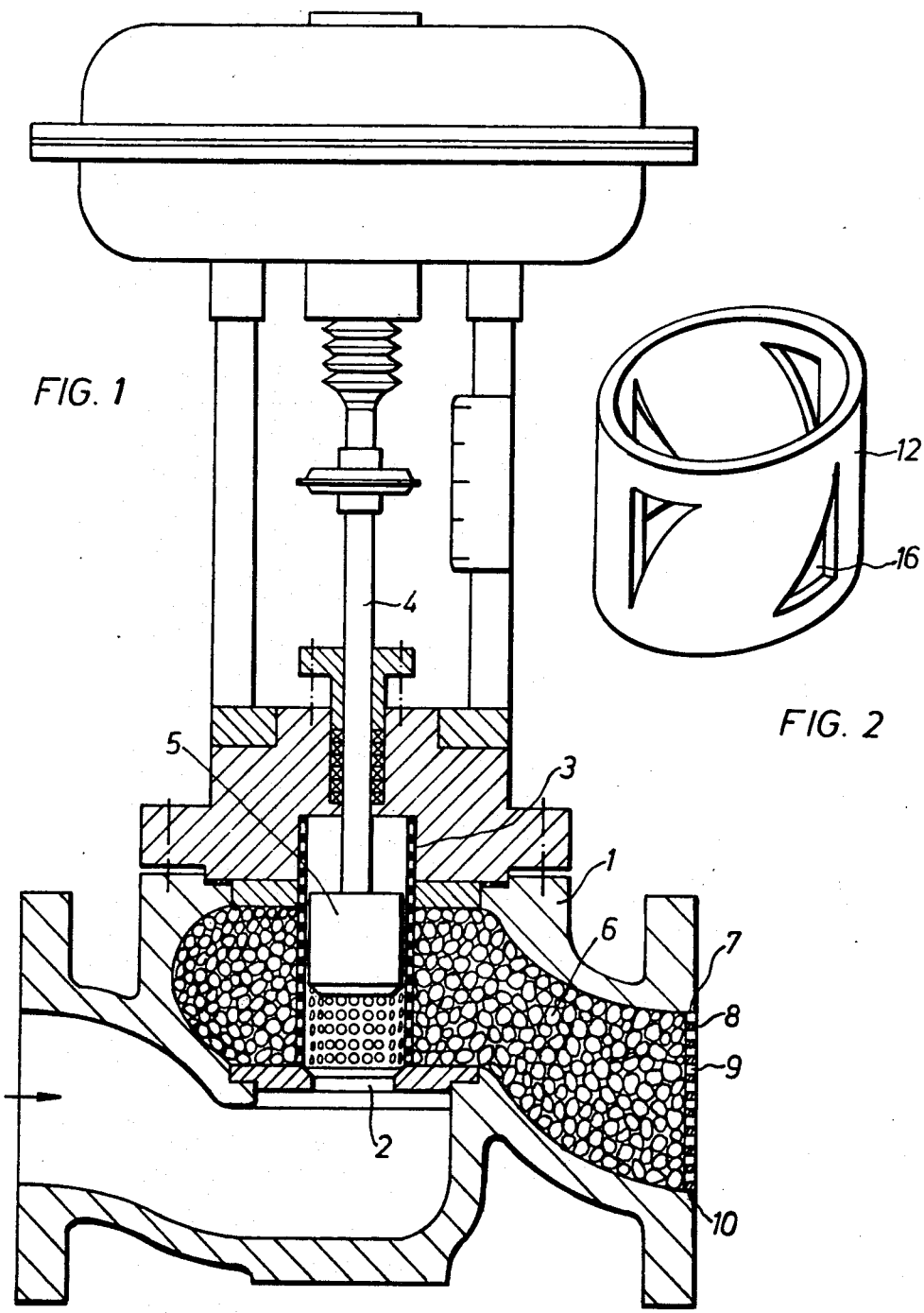
FIG. 1 shows a section through a control valve having resisting bodies.
FIG. 2 shows a view of a section of pipe forming a resisting body.

FIG. 1 shows a perforated cylindrical hollow body 3 arranged inside a valve housing 1 and fixed to an inlet opening 2 of the latter. The hollow body has an internal closure element 5 which is moved by spindle 4 and it is surrounded by a mass 6 of small resisting bodies 7. The mass is kept in place by a perforated disc 8 with openings 9 at outlet 10.

FIG. 2 shows a section of pipe 12 with a triangular apertures 16.

What we claim is:

1. A control valve comprising a valve housing having a fluid inlet and a fluid outlet, a perforated cylindrical hollow body arranged centrally in the housing downstream of the inlet, a closure element disposed in the hollow body, regulating means for displacing the closure element, and a mass of small fluid-flow resisting bodies irregularly situated around the cylindrical hollow body and completely filling the inside of the housing around the hollow body and between the fluid inlet and the fluid outlet, wherein said bodies are unconnected sections of pipe having walls perforated with triangular apertures.

2. A control valve as claimed in claim 1, further comprising a flat perforated plate having openings which are smaller than the minimum dimensions of the resisting bodies and disposed at the outlet.

* * * * *